Patented Jan. 15, 1952

2,582,396

UNITED STATES PATENT OFFICE 2,582,396

PROCESS FOR PREPARING FRUIT SAUCE PRODUCTS

William A. Rooker, Berryville, Va., assignor to H. F. Byrd, Inc., Berryville, Va., a corporation of Virginia No Drawing. Application May 17, 1949, Serial No. 93,845

16 Claims. (Cl. 99—154)

This invention relates to an improved process for preparing fruit sauces and to the improved products obtained thereby. In particular, it relates to an improved process for making apple sauce, and to an improved apple sauce product.

The method generally employed in preparing canned apple sauce comprises peeling, coring and trimming the apples and then conveying the prepared fruit in relatively large pieces to a standard cooker where it is mixed with the requisite quantity of sugar and cooked to the desired degree. The volume of the uncooked apples is so great that for economical operation the cooking must be accomplished in a very short time. In present practice the cooking period seldom exceeds three minutes. To achieve thorough cooking in such a short period the apples are cooked under pressure at temperatures of about 216° to 226° F. The requisite cooking temperatures and pressures are generally obtained by the injection of steam into a closed cooking chamber. A disadvantage in such a cooking procedure stems from the fact that to obtain a desirable sauce it is advisable to combine several varieties of apples. For example, some varieties cook into a sauce of good color and consistency but poor flavor, while others provide excellent flavor and aroma but poor consistency or color. Hitherto, all of the varieties have been combined in the desired proportions and cooked together with the result that either the soft varieties are overcooked, producing a pasty, off-colored sauce, or the hard varieties are under-cooked.

After cooking is completed, the cooked mass is conveyed into a standard finishing machine where the coarse fibers and peel particles are removed. At this point any hard, under-cooked apple fragments present are removed with the waste. When the cooked mass leaves the cooker and enters the finisher there is a sudden drop from the superatmospheric pressures maintained in the cooker to the normal pressure prevailing in the finisher, with an accompanying flash-off of vapor and drop in temperature. At the same time a large proportion of the aromatic flavoring constituents in the apple volatilizes with resulting impairment of the flavor and aroma of the apple sauce product.

The object of this invention is to provide an improved process for preparing fruit sauces whereby loss of the aromatic constituents of the fruit is substantially eliminated with consequent improvement in aroma and flavor of the finished product.

Another object is to provide an improved process for preparing fruit sauces wherein several varieties having different cooking properties may be combined into a single product without undercooking or over-cooking of individual fruit components, thereby improving the color and texture of the product and eliminating waste.

Still another object is to provide fruit sauce products and specifically apple sauce, which are improved with respect to color, flavor, texture, consistency and aroma.

Other objects and advantages will become apparent from the following description.

In my studies of the various varieties of apples used in sauce blending, I have found that the aromatic varieties are, in most cases, soft and quickly cooked varieties. Therefore, when combined with harder, relatively non-aromatic varieties in the cooker, the aromatic varieties tend to become over-cooked, pasty and discolored. If it is attempted to avoid these undesirable results by shortening the cooking period, the harder varieties present in the blend remain under-cooked, leaving hard, apple cuttings which are eliminated with the waste in the finisher. Furthermore, a substantial portion of the desired aromatic constituents present in the aromatic varieties are volatilized and lost at the elevated cooking temperatures and during the flash-off which occurs when the cooked mass travels from the pressure conditions prevailing in the cooker to the normal pressures prevailing in the finisher, thus vitiating the primary purpose of employing the aromatic varieties in the original blend.

I have discovered that raw fruit if properly prepared can be added to cooked sauce without further processing to prevent subsequent spoilage. When the aromatic varieties are added to the cooked varieties in uncooked form, according to my process, the resulting sauce is markedly improved in flavor, texture, color and aroma.

In general, my process comprises preparing and cooking the harder, non-aromatic fruit varieties in the usual manner, separately pulping the uncooked aromatic varieties and adding the uncooked pulp to the cooked sauce while the latter is still at a sufficiently elevated temperature to sterilize the added non-sterilized mass. In this way, the blended fruit varieties subjected to the cooking procedure, being relatively similar in their cooking properties, are uniformly cooked to the proper consistency. By eliminating the cooking of the softer, aromatic at the relatively high cooking temperatures and the flash-off accompanying the sudden release of the cooking pressures, the desired aromatic constituents are retained substantially in their entirety.

More specifically, my process is applied to the commercial preparation of apple sauce in the following manner: The fruit is peeled, cored, trimmed and cut in the usual manner. The hard, non-aromatic varieties in the desired proportions are then processed in standard fashion by running them through the cooker where they are cooked by the injection of steam under pressure at temperatures generally within the range of about 216° to 226° F. The cooked mass is then conveyed to the standard finisher. When the sauce is released from the pressures maintained in the cooker, the temperature of the sauce drops several degrees in the course of the flash-off of steam.

The soft, aromatic apple varieties which have also been peeled, cored and trimmed, are passed through any suitable device, such as a grinder or chopper to obtain a raw apple pulp of comparatively fine texture. The raw pulp is added to the cooked sauce as soon as the latter leaves the finisher and mixed therewith in a suitable vessel, as for example, a blending kettle. The mixing may be done in any suitable manner but should be accomplished as quickly as possible. The blended sauce is immediately poured into cans which are sealed and held for a sufficient length of time to permit the hot cooked sauce to sterilize the raw fruit particles. Three to five minutes are generally ample for sterilization. The sealed cans are then cooled, labeled and cased in the usual manner. The blended sauce may be held in the blending vessel until sterilization of the raw pulp is accomplished before canning. However, since such a procedure is conducive to some loss of flavoring constituents due to volatilization, I prefer to complete sterilization under seal.

The raw pulp may be added to the hot cooked sauce, which will ordinarily be at temperatures somewhat in excess of 200° F., and generally in the neighborhood of about 205° to 210° F. at ordinary room temperatures so long as the raw pulp is not added in sufficient quantity to reduce the temperature of the apple sauce mixture below the minimum sterilization temperature, which is about 160° F. However, pectization may occur even at temperatures above 160° F., and I prefer for practical reasons to employ a minimum temperature of about 185° F. since at this temperature the pectization enzymes are completely inactivated.

If the quantity of raw pulp added is so large as to reduce the temperature of the combined apple mass below about 185° F., it is advisable to warm the raw pulp somewhat. In general, the quantities of aromatic varieties employed range in the neighborhood of 5 to 25 percent of the total, with about 33 to 35 percent as the desirable maximum for a superior product. The degree to which the raw pulp must be warmed will vary, of course, with the proportion of raw pulp employed and the precise temperature of the cooked sauce as it leaves the finisher. Assuming that the temperature of the cooked sauce at the time of blending is in the usual range of about 205° F. to 210° F., and about 33 to 35 percent of raw pulp is to be incorporated, the raw mass will require heating to about 135° to 140° F. before blending. However, since such large proportions of aromatic apple varieties are rarely used, the extent of warming will usually be considerably below these temperatures. Whether or not the raw pulp requires warming, and if so, the temperature to which it must be raised so as not to cool the cooked sauce below about 185° F., can readily be determined by any one skilled in the art and is calculated on the basis of the temperature of the cooked finished sauce, and the proportion of raw pulp.

Appreciable volatilization of aromatic apple constituents does not occur until a temperature of about 150° F. is reached. Since even where the warming of the raw pulp is required according to my process, the temperatures do not attain volatilization temperatures, there is no appreciable loss of the flavoring components. Any tendency toward volatilization at the blending temperature is minimized by rapid mixing. The rate of volatilization at the blending temperature is of course considerably less than at cooking temperatures. Losses due to volatilization during blending are further minimized by the entrapping of volatilized components within the body of the sauce. Since sterilization of the raw pulp is accomplished under seal, there are no volatilization losses at this point.

The following example is illustrative of my new process, but is in no way limiting:

*Example I*

The following apple varieties were employed in the stated proportions:

| | Per cent |
|---|---|
| York | 30 |
| Stayman | 30 |
| Rome | 25 |
| Delicious (the aromatic variety) | 15 |

The York, Stayman and Rome apples were mixed in the given ratios and then processed in the usual manner. They were peeled, cored, trimmed, chopped and combined with sufficient cane sugar to give the finished sauce an added sugar content of 9.5%. The prepared apples were conveyed into a cooker where they were cooked for approximately 3.5 minutes under steam pressure at a temperature of 219° to 221° F. The cooked sauce was conveyed into a finisher where coarse fibers and peel particles were removed. The decrease in pressure coincident with removal of the sauce from the cooker to the finisher resulted in a flash-off of steam and drop in temperature to about 212° F. The cooked sauce was then pumped to a blending kettle at a temperature of 208° F.

The Delicious apples were peeled, cored, trimmed and pulped. The raw pulp was warmed to 110° F. and added to the hot, cooked sauce in the blending kettle. After rapid mixing or blending the sauce was poured into cans and sealed. The sauce temperature at the time of canning was 190° F. The sealed cans were allowed to stand for five minutes to effect sterilization and then cooled quickly in running water.

By cooking only the harder, non-aromatic apple varieties the process can be readily controlled so as to ensure thorough cooking without undercooking or over-cooking of any of the component varieties. This eliminates both the waste of under-cooked apple fragments and the pasty, off-colored characteristics resulting from the over-cooking of the soft apple components. Furthermore, by not subjecting the aromatic varieties to the high cooking temperatures and the flash-off coincident with release of the cooking pressures, the aromatic constituents are retained with substantially no loss. The resulting finished sauce is markedly improved in color, texture, flavor and consistency.

In Example II are presented representative data which clearly illustrate the improved qualities of the apple sauce prepared according to my process. It compares the ratings of two lots of sauce prepared from the same fruit at practically the same time by my new process and by the hitherto employed process, wherein all of the component apple varieties are cooked together. The sauces were rated with respect to the five factors which determine the grade according to the accepted and standardized procedures.

*Example II*

| Factor | Old Process | New Process |
| --- | --- | --- |
| Color | 18.0 | 19.0 |
| Flavor | 18.0 | 20.0 |
| Texture | 18.5 | 19.5 |
| Consistency | 18.0 | 19.0 |
| Defects | 17.5 | 17.5 |
| Total Score | 90.0 | 95.0 |
| Grade | Low Fancy | High Fancy |

To be graded as "Fancy," the apple sauce must have a total score of not less than 90 and individual scores of not less than 18 as to color, consistency and flavor. Sauces having total scores of less than 90 on the five rated factors, or less than 18 on the three above mentioned specific factors, are rated and sold as "Standard" grade. Since apple sauces prepared according to my process improve color, consistency and flavor and increase the total score by an average of five points as compared with sauces produced by the usual methods, it not only raises low "Fancy" grades to high "Fancy" grades, but it brings many "Standard" lots into the "Fancy" grade. Standard sauces rarely score less than 86.

Although my new process has been particularly described with respect to the preparation of apple sauce, it is equally suitable for the preparation of sauces from other fruits, as for example, for consumption by young children. In general, any fruit which is suitable for the preparation of a sauce may be processed according to my method so long as it has a pH of less than 4 to ensure sterilization of the added uncooked pulp. Examples of other fruits which can be made into sauces by my process, include apricots, peaches, pears, pineapples, plums, quince and the like. As in the case of apples, the non-aromatic varieties employed in the desired blend are cooked separately and the aromatic varieties in the form of raw pulp added to and sterilized by the hot cooked sauce. The cooking temperatures will, of course, vary with the individual fruit and care must be taken not to add cool, raw pulp in such large quantities as to reduce the temperature of the mixed batch below the requisite sterilization temperature for the particular fruit. In practice, it may be advisable not to reduce the temperature of the mixed sauce quite to the minimum sterilization temperature to make certain that cooling below the effective temperature does not occur during the short interval requisite for accomplishing complete sterilization. The raw pulp may be warmed somewhat so as to permit the inclusion of larger quantities. The raw pulp should be thoroughly mixed with the hot, cooked sauce as rapidly as possible, immediately poured into containers and sealed. After sterilization of the raw pulp is completed in the containers, the containers are cooled, labeled and packed in the usual manner.

My process is also applicable to mixtures of different kinds of fruit, as for example, sauces comprising blends of apples and apricots, pears and apples, and the like. The harder fruit is subjected to the standard cooking and finishing procedures while the softer fruit is added as raw pulp with consequent improved control of the cooking process and retention of flavor.

My process is equally well adapted to the preparation of sauce from a single variety of fruit. Although the problem of under or over cooking is not presented in such a case, there is substantial loss of aromatic constituents during the cooking and flash-off process. By cooking a portion of the fruit and adding the remainder in the form of raw pulp to the hot cooked sauce as aforedescribed, the aromatic constituents present in the uncooked portion are retained substantially in their entirety with consequent improvement of the finished sauce with respect to flavor and aroma.

Although this invention has been described with reference to illustrative embodiments thereof, it will be apparent to those skilled in the art that the principles of this invention may be embodied in other forms, but within the scope of the appended claims.

Having thus described my invention, I claim:

1. A process for preparing fruit sauces from fruit having a pH less than 4 which comprises cooking a portion of the fruit to form a hot, cooked, sterile sauce, comminuting a portion of the fruit into a raw pulp, admixing said raw fruit pulp with said hot, cooked, sterile fruit sauce in such proportion that said raw pulp is heat-sterilized by said hot, cooked sauce, said mixture substantially retaining the aromatic constituents present in the raw fruit component.

2. A process for preparing fruit sauces from fruit having a pH less than 4 which comprises cooking a portion of the fruit to form a hot, cooked, sterile sauce, comminuting a portion of the fruit into a raw pulp, admixing said raw fruit pulp, which is at a temperature below the minimum sterilization temperature for said fruit, with hot, cooked, sterile fruit sauce, which is at a temperature substantially above the minimum sterilization temperature for said raw pulp, in such proportion that the resulting temperature of the mixture is sufficient to accomplish heat sterilization of said raw pulp, and maintaining said mixture at sterilization temperature until sterilization of said raw pulp is completed, said mixture substantially retaining the aromatic constituents present in the raw fruit component.

3. A process for preparing fruit sauces from fruit having a pH less than 4 which comprises cooking a portion of the fruit to form a hot, cooked, sterile sauce, comminuting a portion of the fruit into a raw pulp, admixing said raw fruit pulp, which is at ordinary temperature, with hot, cooked, sterile fruit sauce, which is at a temperature substantially above the minimum sterilization temperature for said raw pulp, in such proportion that the resulting temperature of the mixture is sufficient to accomplish heat sterilization of said raw pulp, and maintaining said mixture at sterilization temperature until sterilization of said raw pulp is completed, said mixture substantially retaining the aromatic constituents present in the raw fruit component.

4. A process for preparing fruit sauces from fruit having a pH less than 4 which comprises cooking a portion of the fruit to form a hot, cooked, sterile sauce, comminuting a portion of the fruit into a raw pulp, admixing said raw fruit pulp with said hot, cooked, sterile fruit sauce, said cooked sauce being at a temperature substantially above the minimum sterilization temperature for said raw pulp, and said raw pulp being at a temperature below minimum sterilization temperature for said raw pulp but sufficiently above ordinary temperature to permit incorporation of the desired quantity of raw pulp into the hot, cooked sauce without reducing the resulting temperature of the mixture below sterilization temperature, and maintaining said mixture at sterilization temperature until sterilization of said raw pulp is completed, said mixture substantially retaining the aromatic constituents present in the raw fruit component.

5. Process for preparing fruit sauces from fruit having a pH less than 4, said sauces comprising blends including aromatic and relatively non-aromatic fruit varieties, which comprises cooking the relatively non-aromatic fruit to form hot, cooked, sterile sauce, reducing the aromatic varieties into a raw pulp, admixing said raw pulp with said hot, cooked sauce which is at a temperature substantially above the minimum sterilization temperature for said raw pulp, in such proportion that the resulting temperature of the mixture is sufficient to accomplish sterilization of said raw pulp, and maintaining said mixture at sterilization temperature until sterilization of said raw pulp is completed, said mixture substantially retaining the aromatic constituents present in the raw fruit component.

6. Process for preparing fruit sauces from fruit having a pH less than 4, said sauces comprising blends including relatively hard and relatively soft fruit varieties, which comprises cooking the relatively hard fruit to form a hot, cooked, sterile sauce, reducing the relatively soft fruit into a raw pulp, admixing said raw pulp which is at a temperature substantially below the minimum sterilization temperature for said raw pulp with said hot, cooked sauce which is at a temperature substantially above said minimum sterilization temperature, in such proportion that the resulting temperature of the mixture is sufficient to accomplish sterilization of said raw pulp, and maintaining said mixture at sterilization temperature until sterilization of said raw pulp is completed.

7. A process for preparing apple sauce, said sauce comprising a blend including aromatic and relatively non-aromatic apple varieties, which comprises cooking the relatively non-aromatic apples to form a hot, cooked, sterile sauce, reducing the aromatic apples into a raw pulp, admixing said raw pulp with said hot, cooked sauce which is at a temperature substantially above the minimum sterilization temperature for said raw pulp, in such proportion that the resulting temperature of the mixture is sufficient to accomplish sterilization of said raw pulp, and maintaining said mixture at sterilization temperature until sterilization of said raw pulp is completed, said mixture substantially retaining the aromatic constituents present in the raw apple component.

8. A process for preparing apple sauce, said sauce comprising a blend including relatively hard and relatively soft apple varieties, which comprises cooking the relatively hard apple varieties to form a hot, cooked, sterile sauce, reducing the relatively soft apples into a raw pulp, admixing said raw pulp which is at a temperature substantially below the minimum sterilization temperature for said raw pulp with said hot, cooked sauce which is at a temperature substantially above said minimum sterilization temperature, in such proportion that the resulting temperature of the mixture is sufficient to accomplish sterilization of said raw pulp, and maintaining said mixture at sterilization temperature until sterilization of said raw pulp is completed.

9. A process for preparing apple sauce, said sauce comprising a blend including aromatic and relatively non-aromatic apple varieties which comprises, cooking the relatively non-aromatic apple varieties to form a hot, cooked, sterile sauce, reducing the aromatic apple varieties into a raw pulp, admixing said raw pulp, which is at ordinary temperature, with said hot, cooked sauce, which is at a temperature substantially above minimum sterilization temperature for said raw pulp, in such proportion that the resulting temperature of the mixture is sufficient to accomplish sterilization of said raw pulp, and maintaining said mixture at sterilization temperature until sterilization of said raw pulp is completed, said mixture substantially retaining the aromatic constituents present in the raw apple component.

10. A process for preparing apple sauce, said sauce comprising a blend including aromatic and relatively non-aromatic apple varieties, which comprises cooking the relatively non-aromatic apples to form a hot, cooked, sterile sauce, reducing the aromatic apples into a raw pulp, admixing said hot, cooked sauce which is at a temperature substantially above the minimum sterilization temperature for said raw pulp with said raw pulp, which is at a temperature substantially below said minimum sterilization temperature but sufficiently above ordinary temperature, to permit incorporation of the desired quantity of raw pulp into the hot, cooked sauce without reducing the temperature of the mixture below said sterilization temperature, and maintaining said mixture at sterilization temperature until sterilization of said raw pulp is completed, said mixture substantially retaining the aromatic constituents present in the raw apple component.

11. A process for preparing apple sauce which comprises cooking a portion of the apples to form a hot, cooked, sterile sauce, comminuting a portion of the apples into a raw pulp, admixing said raw apple pulp with said hot, cooked, sterile apple sauce, in such proportion that said raw pulp is heat-sterilized by said hot, cooked sauce, said mixture substantially retaining the aromatic constituents present in the raw apple component.

12. A process for preparing apple sauce which comprises cooking a portion of the apples to form a hot, cooked, sterile sauce, comminuting a portion of the apples into a raw pulp, admixing said raw apple pulp with said hot, cooked, sterile apple sauce, said cooked sauce being at a temperature substantially above the minimum sterilization temperature for said raw pulp, in such proportion that the resulting temperature of the mixture is sufficient to accomplish heat-sterilization of said raw pulp, and maintaining said mixture at sterilization temperature until sterilization of said raw pulp is completed, said mixture substantially retaining the aromatic constituents present in the raw apple component.

13. A process for preparing apple sauce, said sauce comprising a blend including aromatic and relatively non-aromatic apple varieties, which comprises cooking the relatively non-aromatic apples to form a hot, cooked, sterile sauce, reducing the aromatic apples into a raw pulp, admixing said raw pulp which is at a temperature substantially below about 185° F. with the hot, cooked sauce which is at a temperature substantially above about 185° F., in such proportion that the resulting temperature of the mixture is not reduced below about 185° F., and maintaining said mixture at sterilization temperature until sterilization of said raw pulp is completed.

14. A process for preparing apple sauce, said sauce comprising a blend including aromatic and relatively non-aromatic apple varieties, said relatively non-aromatic apples being in major proportion, which comprises cooking the relatively non-aromatic apples to form a hot, cooked, sterile sauce, reducing the aromatic apples into a raw pulp, admixing said raw pulp which is at ordinary temperature with said hot, cooked sauce, which is at a temperature substantially above about 185° F., in such proportion that the resulting temperature of the mixture is not reduced below about 185° F., and maintaining said mixture at sterilization temperature until sterilization of said raw pulp is completed.

15. A process for preparing apple sauce, said sauce comprising a blend including relatively hard and relatively soft apple varieties, said relatively hard apples being in major proportion, which comprises, cooking the relatively hard apples to form a hot, cooked, sterile sauce, reducing the aromatic apples into a raw pulp, admixing said hot, cooked sauce, which is at a temperature substantially above about 185° F., with said raw pulp, which is at a temperature substantially below about 185° F., in such proportion that the resulting temperature of the mixture is not reduced below about 185° F., and maintaining said mixture at sterilization temperature until sterilization of said raw pulp is completed.

16. A process for preparing fruit sauces, said sauces comprising blends including relatively hard and relatively soft fruit varieties having a pH less than 4, which comprises cooking said relatively hard varieties to form a hot, cooked, sterile sauce, comminuting said relatively soft varieties into raw pulp and admixing said raw fruit pulp with said hot, cooked, sterile sauce in such proportion that said raw pulp is heat-sterilized by said hot cooked sauce.

WILLIAM A. ROOKER.

REFERENCES CITED

The following references are of record in the file of this patent:

UNITED STATES PATENTS

| Number | Name | Date |
| --- | --- | --- |
| 1,377,681 | Hayda | May 10, 1921 |
| 2,280,365 | Baier | Apr. 12, 1942 |